Jan. 31, 1961 W. E. SELL ET AL 2,969,672
WIND VELOCITY AND DIRECTION INDICATING DEVICE
Filed Nov. 18, 1957 2 Sheets-Sheet 1
*Fig.1*
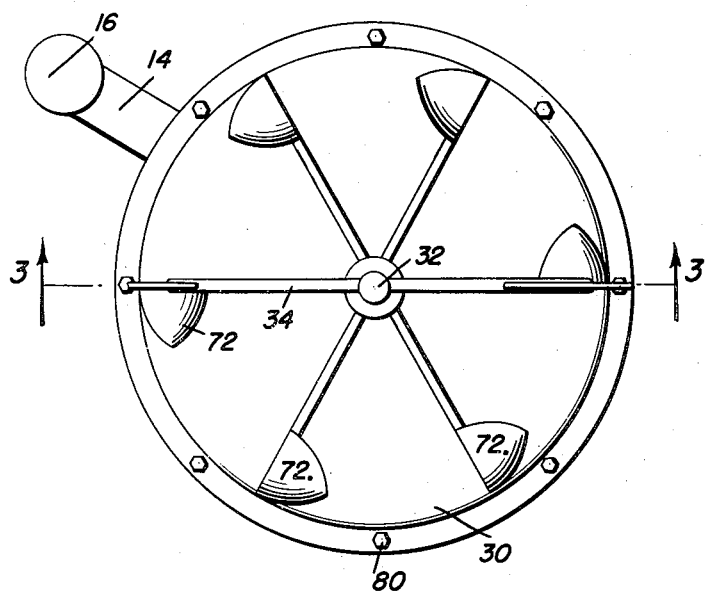
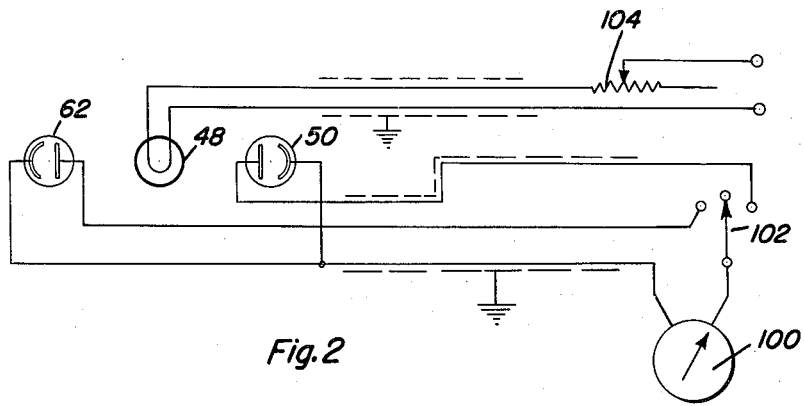
*Fig.2*
Wayne E. Sell
Doyl E. Sell
INVENTORS
BY *Clarence A. O'Brien
and Harvey B. Jacobson*
Attorneys

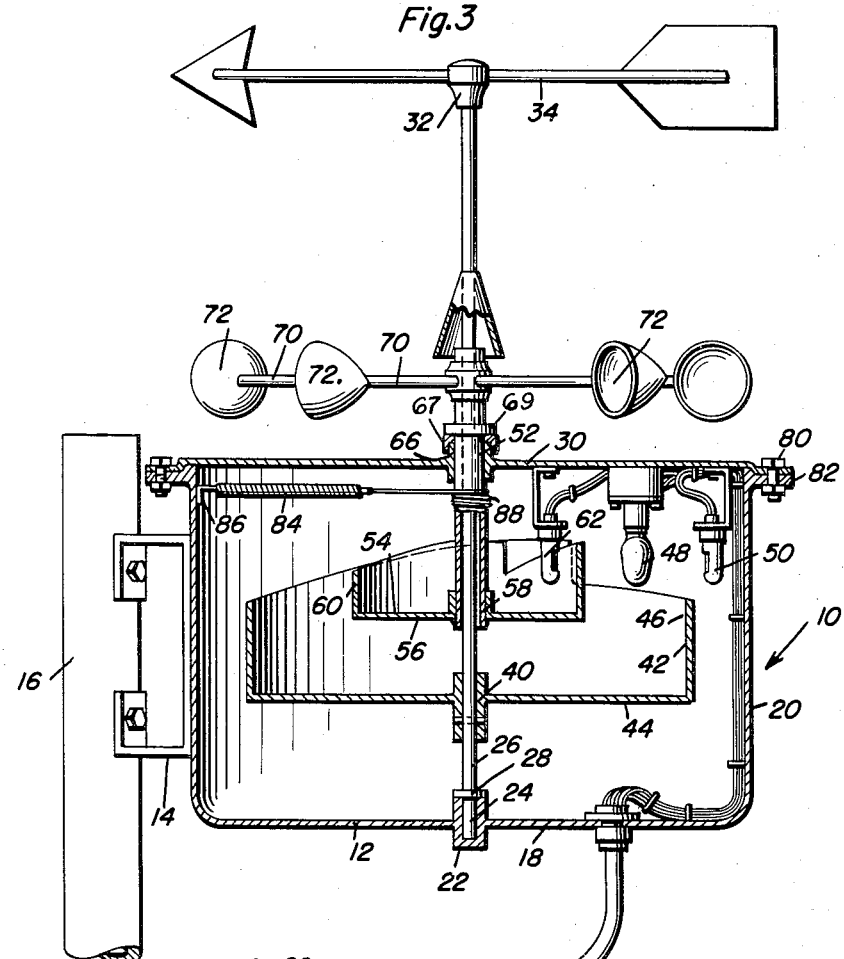
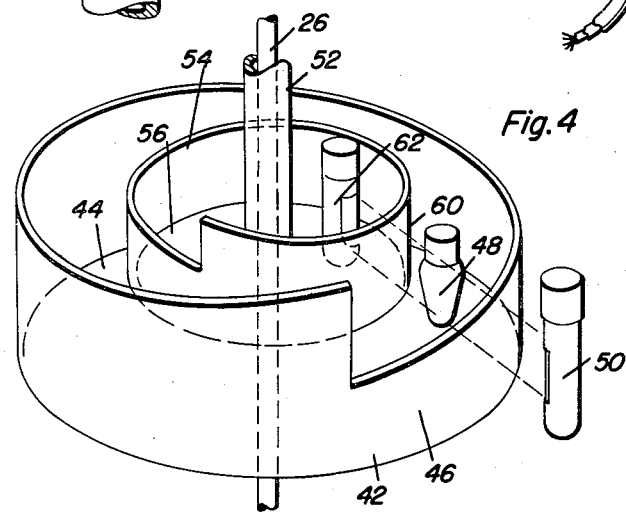

ic cell and said source of illumination, a second photo-electrical cell, and a second light shield secured to said sleeve and being disposed between said source of illumination and said second photo-electrical cell.

United States Patent Office 2,969,672
Patented Jan. 31, 1961

2,969,672

WIND VELOCITY AND DIRECTION INDICATING DEVICE

Wayne E. Sell, 7415 Marquette, Dallas, Tex., and Doyl E. Sell, 4946 Gibbs Road, Kansas City, Kans.

Filed Nov. 18, 1957, Ser. No. 696,977

10 Claims. (Cl. 73—189)

This invention relates to a device adapted to detect and measure the velocity and direction of the wind and to remotely indicate on an electrical meter the wind velocity and direction thereof.

The primary object of the present invention resides in the provision of a wind velocity and direction indicating device which may be mounted on the mast of a ship, a flag pole, or the like in any convenient place and which is so arranged as to provide a remote indication of the wind velocity and direction thereof, which is relatively accurate and which does not require a complex arrangement of moving parts.

The construction of this invention features the use of a source of illumination which is employed in conjunction with light guards of varying dimensions whereby, depending upon the position of the light guards, a variable amount of light which passes from the source of illumination impinges upon photoelectric cells. The photoelectric cells are connected to suitable indicating devices or a single device through a switching arrangement whereby the wind velocity and direction thereof may be readily observed at a location remote from the sensing elements of the device.

Further objects and features of this invention reside in the provision of a wind velocity and direction indicating device that is simple in construction, easy to install, capable of being mounted in a light-proof and substantially weatherproof housing, and which is efficient in use.

These, together with the various ancillary objects and features of the invention which will become apparent as the following description proceeds, are attained by this wind velocity and direction indicating device, a preferred embodiment of which has been illustrated in the accompanying drawings, by way of example only, wherein:

Figure 1 is a plan view of the invention;

Figure 2 is a circuit diagram of the electrical components of the invention;

Figure 3 is a vertical sectional detail view as taken along the plane of line 3—3 in Figure 1 illustrating the construction of the invention in greater detail; and Figure 4 is a partial perspective view of the device illustrating in particular the arrangements of the source of illumination, the photoelectric cells and the light shields.

With continuing reference to the accompanying drawings wherein like reference numerals designate similar parts throughout the various views, reference numeral 10 generally designates the wind velocity and direction indicating device comprising the present invention which includes a housing 12 preferably lightproof and substantially weather-proof which is secured by means of a suitable bracket 14 of any configuration desired to a pole, mast or other structure, as indicated at 16. The housing 12 includes a bottom 18 integrally formed with a substantially cylindrical side wall 20 and the bottom is provided with a socket 22 forming a bearing for the end 24 of shaft 26 having a collar 28 forming a thrust bearing for the shaft 26.

The shaft 26 extends upwardly through the top 30 of the housing 12. Of course, any other suitable bearing arrangements may be provided for the shaft 26. The shaft 26 terminates in a fitting 32 for supporting a vane 34 of any suitable configuration for indicating the direction of wind. Thus, the direction of the wind will cause the shaft 26 to be rotated to a particular position. Fixed to the shaft 26 as at 40 is a light screen 42 having a bottom wall 44 and a side wall 46, the side wall 46 being cylindrical and being of a varying height thereby providing a varying amount of screening for the light source 48 with respect to a photoelectric cell 50.

Mounted on a sleeve 52 is a second light screen 54 having a bottom 56 fixedly secured as at 58 to the sleeve and having a cylindrical side wall 60 of varying height so that the light screen 54 provides a varying amount of screening depending upon the position of the light screen for a photo cell 62. The sleeve 52 extends up through the top 30 where it passes through an opening 66 which has a peripheral collar and which is externally threaded for threaded reception of a bearing member 67 against which a collar 69 mounted on the sleeve 52 can engage. The sleeve has affixed thereto a plurality of spokes as at 70 carrying cups 72 of generally conventional configuration for rotation to a particular position dependent upon the velocity of the wind.

The top 30 is detachably secured as by bolts 80 to the peripheral flange 82 integrally formed with the side wall 20 of the housing. Mounted within the housing is a spring 84 which is secured to the side wall as at 86 of a housing and which has a cord 88 connected thereto, the cord being wrapped about the sleeve 52. The spring 84 thus serves to limit rotation of the sleeve due to the force exerted on the cups 72 by the wind in proportion to the force of the wind and thus the light shield 60 is rotated to a particular position dependent upon the force of the wind.

A meter is provided as at 100 and a switch 102 is arranged so as to connect the meter 100 to either the output circuit of the photoelectric cell 62 or to the output circuit of the photoelectric cell 50. Inasmuch as the photoelectric cells are of a self-generating type, the output thereof will be dependent upon the amount of light which impinges thereon and since the amount of light is controlled by the position of the light shields, the meter 100 may be readily calibrated to indicate the position of the vane 34 and the position of the cups 72 thus indicating the direction and velocity of the wind. Thus, the vector quantity of wind direction and force can be transmitted to a meter 100 as a direct reading result. A rheostat or potentiometer 104 may be provided for controlling the amount of illumination provided by the lamp 48 for optimum reading of the meter 100.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a wind velocity and direction indicating device, the combination of a housing, a shaft journalled in said housing and having a wind direction vane fixed thereto, a sleeve rotatably mounted on said shaft extending into said housing and having a plurality of cups mounted thereon outwardly of said housing, spring means terminally secured to said sleeve for limiting rotation of said sleeve in response to wind force applied to said cups, a source of illumination in said housing, a first light shield secured to said shaft, a first photo-electrical cell, said first light shield being disposed between said first photoelectric cell and said source of illumination, a second light shield secured to said sleeve, and a second photo-electric cell, said second light shield being disposed between said second photo-electric cell and said source of illumination.

2. In a wind velocity and direction indicating device, the combination of a housing, a shaft journalled in said housing and having a wind direction vane fixed thereto, a sleeve rotatably mounted on said shaft extending into said housing and having a plurality of cups mounted thereon outwardly of said housing, spring means terminally secured to said sleeve for limiting rotation of said sleeve in response to wind force applied to said cups, a source of illumination in said housing, a first light shield secured to said shaft, a first photo-electric cell, said first light shield being disposed between said first photo-electric cell and said source of illumination, a second light shield secured to said sleeve, and a second photo-electric cell, said second light shield being disposed between said second photo-electric cell and said source of illumination, said first light shield and said second light shield being of cylindrical shape and concentrically disposed about said shaft.

3. In a wind velocity and direction indicating device, the combination of a housing, a vertical shaft journalled in said housing and having a wind direction vane fixed thereto, a sleeve rotatably mounted on said shaft extending into said housing and having a plurality of cups mounted thereon outwardly of said housing, spring means terminally secured to said sleeve for limiting rotation of said sleeve in response to wind force applied to said cups, a source of illumination in said housing, a first light shield secured to said shaft, a first photo-electric cell, said first light shield being disposed between said first photo-electric cell and said source of illumination, a second light shield secured to said sleeve, and a second photo-electric cell, said second light shield being disposed between said second photo-electric cell and said source of illumination, said first light shield and said second light shield being of cylindrical shape and concentrically disposed about said shaft, the vertical dimensions of said first light shield and said second light shield varying whereby a varying amount of light from said source of illumination will impinge on said first photo-electric cell and said second photo-electric cell depending upon the position of said first light shield and said second light shield.

4. In a wind velocity and direction indicating device, the combination of a housing, a shaft journalled in said housing and having a wind direction vane fixed thereto, a sleeve rotatably mounted on said shaft extending into said housing and having a plurality of cups mounted thereon outwardly of said housing, spring means terminally secured to said sleeve for limiting rotation of said sleeve in response to wind force applied to said cups, a source of illumination in said housing, a first light shield secured to said shaft, a first photo-electric cell, said first light shield being disposed between said first photo-electric cell and said source of illumination, a second light shield secured to said sleeve, a second photo-electric cell, said second light shield being disposed between said second photo-electric cell and said source of illumination, said housing being light-proof, and means connected to said source of illumination for controlling the intensity of said source of illumination.

5. A wind velocity and direction indicating device comprising a housing, a vertical shaft journalled in said housing and having a wind direction vane fixed thereto, a sleeve rotatably mounted on said shaft extending into said housing and having a plurality of cups mounted thereon outwardly of said housing, spring means terminally secured to said sleeve for limiting rotation of said sleeve in response to wind force applied to said cups, a source of illumination in said housing, a first light shield secured to said shaft, a first photo-electric cell, said first light shield being disposed between said first photo-electric cell and said source of illumination, a second light shield secured to said sleeve, a second photo-electric cell, said second light shield being disposed between said second photo-electric cell and said source of illumination, said first light shield and said second light shield being of cylindrical shape and concentrically disposed about said shaft, the vertical dimensions of said first light shield and said second light shield varying whereby a varying amount of light from said source of illumination will impinge on said first photo-electric cell and said second photo-electric cell depending upon the position of said first light shield and said second light shield, and at least one meter, the output of said photo-cells being applied individually and selectively to said meter.

6. A wind velocity and direction indicating device comprising a housing, a vertical shaft journalled in said housing and having a wind direction vane fixed thereto, a sleeve rotatably mounted on said shaft extending into said housing and having a plurality of cups mounted thereon outwardly of said housing, spring means terminally secured to said sleeve for limiting rotation of said sleeve in response to wind force applied to said cups, a source of illumination in said housing, a first light shield secured to said shaft, a first photo-electric cell, said first light shield being disposed between said first photo-electric cell and said source of illumination, a second light shield secured to said sleeve, a second photo-electric cell, said second light shield being disposed between said second photo-electric cell and said source of illumination, said first light shield and said second light shield being of cylindrical shape and concentrically disposed about said shaft, the vertical dimensions of said first light shield and said second light shield varying whereby a varying amount of light from said source of illumination will impinge on said first photo-electric cell and said second photo-electric cell depending upon the position of said first light shield and said second light shield at least one meter, the output of said photo-electric cells being applied individually and selectively to said meter, said housing being light-proof, and means connected to said source of illumination for controlling the intensity of said source of illumination.

7. A wind velocity and direction indicating device, comprising in combination, a light-proof housing, a shaft rotatable in and projecting outwardly from said housing, a sleeve rotatable in said housing on said shaft and projecting outwardly from the housing, a first light shield secured to said shaft in said housing, a second light shield secured to said sleeve in said housing in radially inwardly spaced relation from the first light shield, a source of illumination provided in the housing in the space between the first and second light shields, a first photo-electric cell provided in the housing inwardly of the first light shield, a second photo-electric cell provided in the housing outwardly of the second light shield, the first and second light shields having means for varying the amount of light passing from said source of illumination to the respective first and second photo-electric cells in response to rotation of said shaft and of said sleeve respectively, wind direction sensing means provided on the projecting portion of said shaft for rotating the same, wind velocity sensing means provided on the projecting portion of said sleeve for rotating the same, resilient means provided in said housing and operatively connected to said sleeve for biasing the same against rotation by said wind velocity sensing means, and means for individually and selectively determining the output of said first and second photo-electric cells.

8. The device as defined in claim 7 together with means for varying the intensity of said source of illumination.

9. In a wind direction indicating device, the combination of a light-proof housing, a shaft rotatable in and projecting outwardly from said housing, a light shield secured to said shaft for rotation therewith in said housing, a source of illumination provided in the housing at one side of said light shield, a photo-electric cell provided in the housing at the relatively opposite side of the light shield with respect to said source of illumination, said light shield having means for varying the amount of light passing from said source of illumination to said photo-electric cell in response to rotation of the light shield with said shaft, wind direction sensing means provided on the projecting portion of the shaft for rotating the same, and means for determining the output of the photo-electric cell.

10. In a wind velocity indicating device, the combination of a light-proof housing, a shaft rotatable in said housing and projecting outwardly therefrom, a light shield secured to said shaft for rotation therewith in said housing, a source of illumination provided in the housing at one side of the light shield, a photo-electric cell provided in the housing at the relatively opposite side of the light shield with respect to said source of illumination, said light shield having means for varying the amount of light passing from said source of illumination to said photo-electric cell in response to rotation of the light shield with said shaft, wind velocity sensing means provided on the projecting portion of the shaft for rotating the same, resilient means provided in said housing and operatively connected to said shaft for biasing the same against rotation by said wind velocity sensing means, and means for determining the output of the photo-electric cell.

References Cited in the file of this patent
UNITED STATES PATENTS

| 1,265,420 | Bieber | May 7, 1918 |
| 2,410,550 | Padva | Nov. 5, 1946 |
| 2,688,250 | Roberts | Sept. 7, 1954 |